United States Patent
Hara et al.

(10) Patent No.: US 6,695,896 B2
(45) Date of Patent: Feb. 24, 2004

(54) EVAPORATED FUEL TREATMENT APPARATUS

(75) Inventors: Takeshi Hara, Saitama-ken (JP); Hiroaki Mihara, Saitama-ken (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/091,955

(22) Filed: Mar. 5, 2002

(65) Prior Publication Data

US 2002/0124732 A1 Sep. 12, 2002

(30) Foreign Application Priority Data

Mar. 6, 2001 (JP) ......................... 2001-062534

(51) Int. Cl.[7] ..................... F02M 25/08; B01D 53/04
(52) U.S. Cl. ..................... 96/121; 96/132; 96/133; 96/154; 123/519
(58) Field of Search ..................... 96/108, 121, 130, 96/131, 132, 133, 144, 147, 154; 123/518, 519, 520, 521

(56) References Cited

U.S. PATENT DOCUMENTS

| | | | | |
|---|---|---|---|---|
| 3,730,158 A | * | 5/1973 | St. Amand ............ | 123/519 |
| 4,381,929 A | * | 5/1983 | Mizuno et al. ........ | 96/130 |
| 4,386,947 A | * | 6/1983 | Mizuno et al. ........ | 96/137 |
| 4,699,681 A | * | 10/1987 | Kasmark et al. ...... | 156/264 |
| 5,207,808 A | * | 5/1993 | Haruta et al. ........ | 96/131 |
| 5,337,721 A | * | 8/1994 | Kasuya et al. ........ | 123/519 |
| 5,393,329 A | * | 2/1995 | Inagaki et al. ....... | 96/131 |
| 5,408,976 A | * | 4/1995 | Reddy ................ | 123/519 |
| 5,564,398 A | * | 10/1996 | Maeda et al. ......... | 123/520 |
| 5,914,457 A | * | 6/1999 | Itakura et al. ....... | 96/130 |
| 6,230,693 B1 | * | 5/2001 | Meiller et al. ....... | 123/519 |

FOREIGN PATENT DOCUMENTS

JP  9-209849  *  8/1997

* cited by examiner

Primary Examiner—Frank M. Lawrence
(74) Attorney, Agent, or Firm—Lahive & Cockfield, LLP

(57) ABSTRACT

An evaporated fuel treatment apparatus is provided for reducing a refilling time, ensuring satisfactory adsorption/desorption performance for an evaporated fuel, and reducing the manufacturing cost through a simplified structure. The evaporated fuel treatment apparatus comprises a casing having formed therein a first chamber in communication with the fuel tank, a second chamber in communication with the first chamber, and a third chamber in communication with the second chamber and the atmosphere. Active carbons are contained in the first chamber and second chamber for adsorbing fuel components in an evaporated fuel introduced from the fuel tank. An adsorbent is contained in the third sub-chamber for adsorbing fuel components in the evaporated fuel introduced from the second chamber. The adsorbent has an air-flow resistance which is set smaller than that of the active carbons.

4 Claims, 5 Drawing Sheets

EVAPORATED FUEL TREATMENT APPARATUS

BACKGROUND OF THE INVENTION

1. Field of the Invention

The present invention relates to an evaporated fuel treatment apparatus which temporarily adsorbs fuel components within an evaporated fuel to conveniently discharge the evaporated fuel to an intake passage in order to prevent the emission to the atmosphere of the evaporated fuel generated in a fuel tank of an internal combustion engine.

2. Description of the Prior Art

Conventionally, the evaporated fuel treatment apparatus of the type mentioned above is generally called a canister, and is known, for example, from Laid-open Japanese Patent Application No. Hei 7-332171. This canister comprises a box-shaped casing; three chambers, a first through a third chamber defined by partitioning the casing by partition walls; and active carbons filled in each chamber. The first and second chambers, and the second and third chambers communicate with each other. The first chamber is connected to an intake pipe through a purge passage, and is also connected to a fuel tank through a charge passage and a fuel supply charge passage. The fuel supply charge passage is larger than the charge passage for passing a large amount of evaporated fuel generated in a fuel tank during refilling, and a charge electromagnetic valve is provided midway in the fuel supply charge passage for opening and closing the same.

The second chamber is connected to a fuel supply discharge passage in communication with the atmosphere. A discharge control electromagnetic valve is provided midway in the fuel supply discharge passage. Further, the third chamber is connected to an atmosphere passage in communication with the atmosphere. The fuel tank is also provided with a switch which is turned ON when a fuel supply port lid is opened.

In the canister, during a normal operation other than refilling, an evaporated fuel generated in the fuel tank is first introduced into the first chamber through the charge passage, and then introduced into the second chamber and third chamber in this order. In this event, as the evaporated fuel passes through each chamber, fuel components such as hydrocarbons (HC) are adsorbed on the active carbons, and then emitted to the atmosphere through the atmosphere passage. On the other hand, when the fuel is supplied, the fuel supply port lid of the fuel tank is opened, causing the switch to turn ON, the charge electromagnetic valve and discharge control electromagnetic valve are opened in response to the switch. In this manner, the evaporated fuel generated in the fuel tank due to the refilling is introduced into the first chamber through the fuel supply charge passage, next introduced into the second chamber, and then emitted to the atmosphere through the fuel supply discharge passage. Also, when a negative pressure in an intake pipe is introduced into the first chamber through the purge passage due to the operation of the engine, air in the atmosphere flows into the third chamber, second chamber and first chamber in this order through the atmosphere passage. In this event, the fuel components adsorbed on the active carbons are desorbed and sent to the intake pipe together with the air through the purge passage.

As described above, in the canister, the evaporated fuel is introduced into the three chambers in the normal operation, and introduced only into the first chamber and second chamber during refilling. The reason for this operation may be described as follows. In the normal operation, the longest possible length of the flow passage is ensured for the evaporated fuel when it flows through the active carbons in the canister to improve the adsorption performance provided by the active carbons for the evaporated fuel. On the other hand, during refilling, where a larger amount of evaporated fuel is generated than during the normal operation, the length of the flow passage is reduced, as compared with that in the normal operation, to reduce the air-flow resistance in the canister to suppress a rise in the pressure within the fuel tank during refilling caused by the evaporated fuel and thereby reduce a time required for supplying the fuel to the fuel tank.

The conventional evaporated fuel treatment apparatus requires the discharge control electromagnetic valve, fuel supply discharge passage, switch and the like provided for reducing the refilling time, thereby resulting in a correspondingly complicated structure and an increase in the manufacturing cost. Also, the discharge control valve is susceptible to a leak of evaporated fuel. Further, since the first, second and third chambers are defined by partitioning the casing with the partition walls to limit the areas of the active carbons within the casing which are in contact with the external air through the wall of the casing, the active carbons are prevented from changing the temperature through heat exchanging with the external air. This may fail to provide satisfactory adsorption/desorption performance for the evaporated fuel by the active carbons.

OBJECT AND SUMMARY OF THE INVENTION

The present invention has been made to solve the foregoing problems, and it is an object of the invention to provide an evaporated fuel treatment apparatus which is capable of reducing a refilling time, ensuring satisfactory adsorption/desorption performance for an evaporated fuel, and reducing the manufacturing cost through simplification of the structure.

To achieve the above object, the present invention provides an evaporated fuel treatment apparatus for introducing an evaporated fuel generated in a fuel tank of an internal combustion engine to discharge the evaporated fuel to an intake passage, and emitting the evaporated fuel to the atmosphere after adsorbing fuel components contained in the evaporated fuel. The apparatus includes a casing having formed therein a main chamber in communication with the fuel tank, and a sub-chamber in communication with the main chamber and the atmosphere, respectively, a main adsorbent contained in the main chamber to adsorb fuel component in an evaporated fuel introduced from the fuel tank, and a sub-adsorbent contained in the sub-chamber to adsorb fuel components in the evaporated fuel introduced from the main chamber before the evaporated fuel is emitted from the sub-chamber to the atmosphere, wherein the sub-chamber including the sub-adsorbent has an air-flow resistance which is set smaller than an air-flow resistance of the main chamber including the main adsorbent.

According to the evaporated fuel treatment apparatus, an evaporated fuel generated in the fuel tank is introduced into the main chamber, and then introduced into the sub-chamber before it is emitted to the atmosphere. In this event, the evaporated fuel is emitted to the atmosphere after fuel components contained therein are adsorbed by the main adsorbent and sub-adsorbent. In this manner, the evaporated fuel generated in the fuel tank flows along the same flow passage either during refilling or during a normal operation, unlike before, so that the same length can be ensured for the flow passage during refilling as that during the normal operation. Since the air-flow resistance of the sub-chamber including the sub-adsorbent is set smaller than that of the main chamber including the main adsorbent, it is possible to suppress a rise in the overall air-flow resistance of the main chamber and sub-chamber during refilling. Also, the main fuel adsorbent in the main chamber, having a larger air-flow resistance adsorbs, a majority of fuel components in the evaporated fuel, while the sub-adsorbent in the sub-chamber complementally adsorbs the remaining fuel components, thereby making it possible to effectively adsorb the fuel components in the evaporated fuel, and maintain satisfactory adsorption performance. This can lead to a reduction in refilling time during refilling, and to the satisfactory adsorption performance ensured for the evaporated fuel. In addition, since the present invention eliminates an electromagnetic valve, a discharge passage and the like for refilling, which have been conventionally required, the structure can be correspondingly simplified to reduce the manufacturing cost.

Preferably, in the evaporated fuel treatment apparatus, the sub-adsorbent has a slitted cross-section.

According to this preferred embodiment of the evaporated fuel treatment apparatus, the sub-adsorbent can be relatively easily manufactured.

Preferably, in the evaporated fuel treatment apparatus, sub-adsorbent is formed in a honeycomb shape.

According to this preferred embodiment of the evaporated fuel treatment apparatus, the sub-adsorbent surpassing in the strength can be relatively easily manufactured in an integral form.

Preferably, in the evaporated fuel treatment apparatus, a portion forming the main chamber of the casing and a portion forming the sub-chamber are arranged such that they are spaced apart from each other.

According to this preferred embodiment of the evaporated fuel treatment apparatus, the two portions of the casing are arranged such that they are spaced apart from each other, so that larger contact areas can be ensured for the two portions of the casing in contact with external air, thereby making it possible to effectively cool or heat the adsorbents within the casing through heat exchanging with the external air. As a result, the adsorption/desorption performance can be improved for the evaporated fuel.

DETAILED DESCRIPTION OF THE EMBODIMENT

Figure 1:
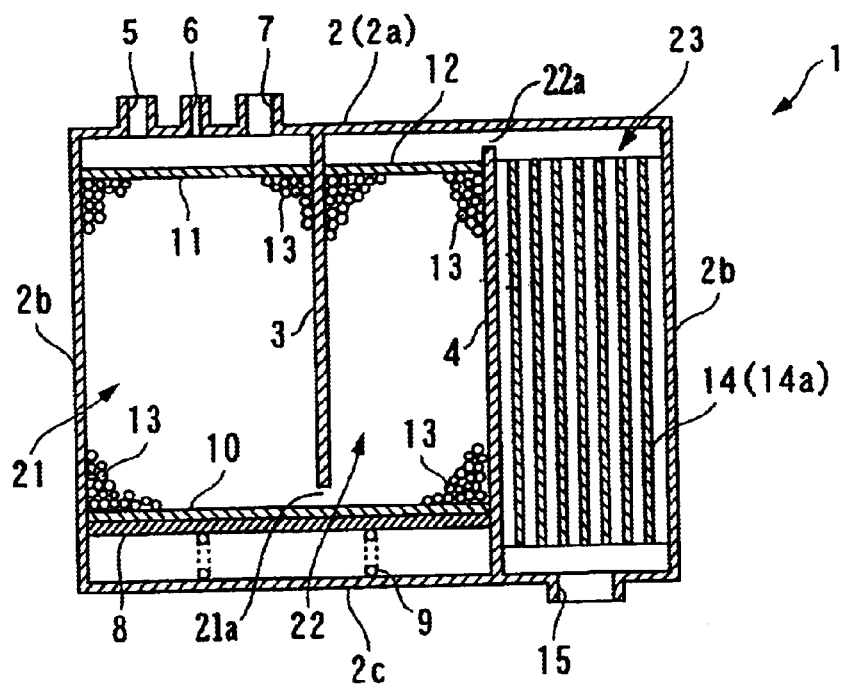
FIG. 1 is a cross-sectional view generally illustrating the structure of an evaporated fuel treatment apparatus according to one embodiment of the present invention.

In the following, one embodiment of the present invention will be described in detail with reference to the accompanying drawings. FIG. 1 generally illustrates the structure of an evaporated fuel treatment apparatus according to the embodiment. As illustrated, the evaporated fuel treatment apparatus (hereinafter called the "canister") 1 comprises a casing 2 formed of a top wall 2a, four side walls 2b and a bottom wall 2c; a first chamber 21 (main chamber), a second chamber 22 (main chamber), and a third chamber 23 (sub-chamber) defined by partitioning the casing 2 by two partition walls 3, 4; and the like.

The top wall 2a of the first chamber 21 is provided with a purge port 5, a charge port 6, and a fuel supply charge port 7. A purge passage, in communication with an intake pipe of an engine (either of them is not shown in the figure), is connected to the purge port 5. A purge control valve, not shown, is disposed midway in the purge passage. The opening of the purge control valve is controlled by a controller, not shown, during an engine operation to perform a purge control.

A charge passage and a fuel supply charge passage (either of them is not shown in the figure), in communication with a fuel tank, are connected to the charge port 6 and fuel supply charge port 7, respectively. An evaporated fuel generated in the fuel tank is introduced into the first chamber 21 through the charge passage and charge port 6 during an normal operation other than fuel supply, and through the fuel supply charge passage and fuel supply charge port 7 during refilling, respectively. The fuel supply charge port 7 and fuel supply charge passage have cross-sectional areas larger than those of the charge port 6 and charge passage, respectively. This is because a larger amount of evaporated fuel is generated during refilling than during the normal operation. Alternatively, a single port may be used in common as the charge port 6 and fuel supply charge port 7, and a single charge passage may be used in common as the charge passage and fuel supply charge passage.

Further, a gap is formed between the lower edge of the partition wall 3 between the first chamber 21 and second chamber 22 and the bottom wall 2c, and the first chamber 21 and second chamber 22 communicate with each other in lower portions thereof through this gap. A horizontal plate-shaped lattice 8 is arranged over the entirety of a space below the lower edge of the partition wall 3 between the first chamber 21 and second chamber 22. This lattice 8 is urged upward and supported by a coil spring 9 disposed between the lattice 8 and bottom wall 2c, thereby forming a space between the lattice 8 and the bottom wall 2c. Also, a filter 10 is carried on the lattice 8 to cover the entire lattice 8.

Filters 11, 12 are disposed above the first chamber 21 and second chamber 22, respectively, with a spacing interposed between the filters 11, 12 and the top wall 2a. These filters 11, 12 are oriented horizontally to form a U-shaped space between the filters 11, 12 and the partition wall 3, filter 10 and the like. The U-shaped space is fully filled with active carbons 13 (main adsorbent) at a predetermined density. The active carbons 13 are provided for adsorbing fuel components such as HC within an evaporated fuel introduced from the charge ports 6, 7 into the first chamber 21 and second chamber 22, and are comprised of granulated carbon having a predetermined average grain diameter (for example, 2 mm). The active carbons 13 may be comprised of shots in place of granulated carbons.

Further, a gap is formed between the upper edge of the partition wall 4 between the second chamber 22 and third chamber 23 and the top wall 2a, such that upper ends of the second chamber 22 and third chamber 23 communicate with each other through this gap.

Figure 2:
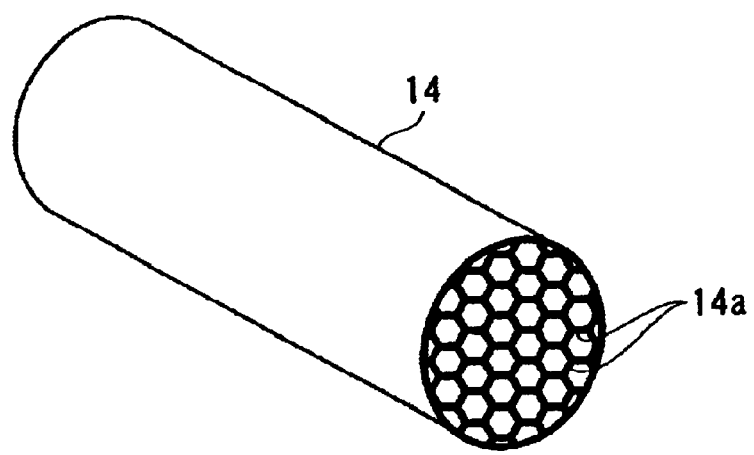
FIG. 2 is a perspective view illustrating the structure of an adsorbent.

The third chamber 23 is substantially fully filled with an adsorbent 14. As illustrated in FIG. 2, this adsorbent 14 (sub-adsorbent) is in a honeycomb structure which has a large number of inner holes of hexagonal shape in cross-section, formed by a large number of partition walls 14a extending in the longitudinal direction. The adsorbent 14 is fitted in the third chamber 23. With this structure, the air-flow resistance of the adsorbent 14 is set smaller than that of the active carbons 13 filled in the first chamber 21 and second chamber 22. Also, the adsorbent 14 is fabricated by mixing a ceramic raw material and active carbons in a predetermined proportion (for example, ceramic raw material active carbons=7:3), forming the mixture into the aforementioned shape, and sintering the formed mixture. A large number of active carbons (not shown) are distributively arranged on the surface of the partition walls 14. With this structure, the evaporated fuel flowing into the third chamber 23 from the second chamber 22 is adsorbed by the active carbons on the partition walls 14a when it passes through the adsorbent 14. The material for the adsorbent 14 is not limited to ceramic, but may be any material having a high thermal capacity. Also, the inner holes of the adsorbent 14 are not limited to the hexagonal shape in cross-sectional, but may be in a rectangular shape, a circular shape, and the like.

The bottom wall 2c of the third chamber 23 is further provided with an atmospheric port 15 to which connected is an atmospheric passage, not shown, in communication with the atmosphere.

Figure 3A:
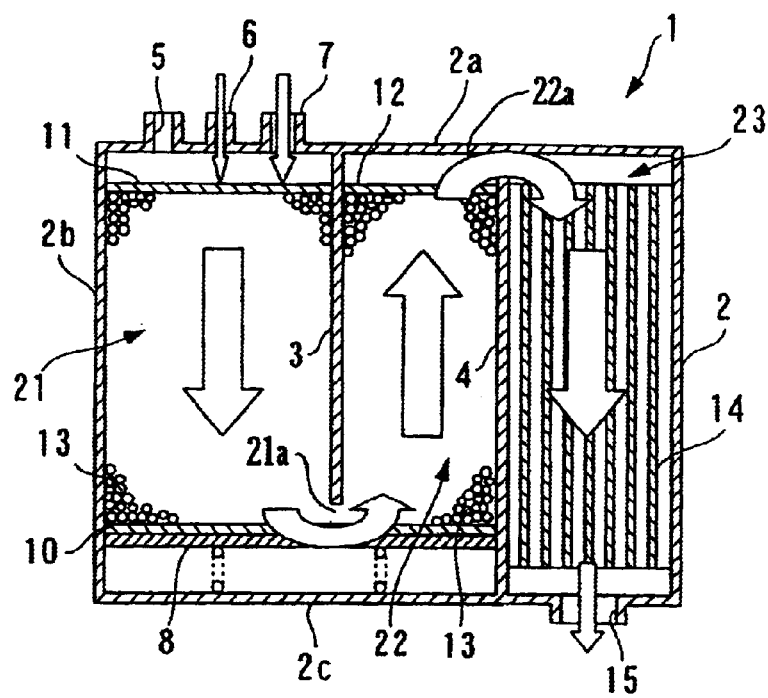
FIG. 3A is an explanatory diagram showing the flow of an evaporated fuel introduced from a fuel tank during refilling and normal operation.

In the following, the operation of the canister 1 will be described with reference to FIGS. 3A, 3B. First, as illustrated in FIG. 3A, an evaporated fuel generated in the fuel tank is introduced into the first chamber 21 through the charge port 6 during a normal operation or through the fuel supply charge port 7 during refilling, respectively. The evaporated fuel introduced into the first chamber 21 in this manner passes through gaps among the active carbons 13 within the first chamber 21, and flows into the second chamber 22 through a communication port 21a, lattice 8 and the like. Next, the evaporated fuel passes through gaps among the active carbons 13 within the second chamber 22, and flows into the third chamber 23 through a communication port 22a. Then, after passing through the adsorbent 14 within the third chamber 23, the evaporated fuel is emitted to the atmosphere through the atmosphere port 15. In this process, a majority of fuel components within the evaporated fuel is adsorbed by the active carbons 14, and the remaining fuel components are adsorbed by the active carbons in the adsorbent 14, so that only air is finally emitted to the atmosphere.

Figure 3B:
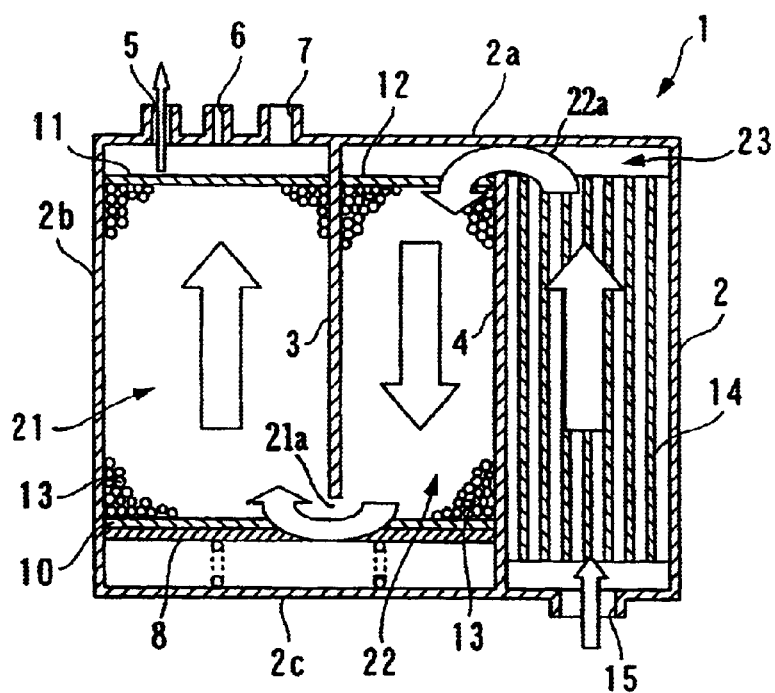
FIG. 3B is an explanatory diagram showing the flow of air introduced from the atmosphere during a purge control.

On the other hand, in a purge control during an engine operation, as the purge control valve is opened by the controller, a negative pressure in the intake pipe is introduced into the first chamber 21 through the purge passage, so that air in the atmosphere is absorbed into the third chamber 23 from the atmospheric port 15, as illustrated in FIG. 3B. The air absorbed into the third chamber 23 in this manner passes through the adsorbent 14 in the third chamber 23, as opposed to the evaporated fuel, then passes through gaps among the active carbons 13 within the second chamber 22, and is fed into the intake pipe through the purge port 5. In this event, the fuel components previously adsorbed by the active carbons 13 and active carbons in the adsorbent 14 are desorbed therefrom, and fed into the intake pipe together with the air.

In the foregoing manner, according to the canister 1 of this embodiment, the evaporated fuel generated in the fuel tank during refilling is introduced into the first chamber 21, second chamber 22 and third chamber 23 in order as is the case with the normal operation, so that the same length of flow path can be ensured during the refilling as well as in the normal operation. Also, since the adsorbent 14 within the third chamber 23 is designed to have a smaller air-flow resistance than the active carbons 13 within the first chamber 21 and second chamber 22, a rise in the air-flow resistance can be suppressed in the flow path of the evaporated fuel within the canister 1 during the refilling. Also, the relationship between the active carbons 13 and adsorbent 14 is set such that a majority of fuel components in the evaporated fuel is adsorbed by the active carbons 13, while the remaining fuel components are complementally adsorbed by the adsorbent 14, so that the fuel components in the evaporated fuel can be effectively adsorbed, and the adsorption performance can be satisfactorily maintained. This can permit a rapid refilling activity, and simultaneously ensure the satisfactory adsorbent performance for the evaporated fuel. In addition, since the discharge control electromagnetic valve, fuel supply discharge passage and switch, which have conventionally been required, are eliminated, the structure can be correspondingly simplified to reduce the manufacturing cost. Also, since the adsorbent 14 is made of ceramic in honeycomb structure, the highly strong adsorbent 14 can be relatively easily fabricated in an integral form.

Figure 4:
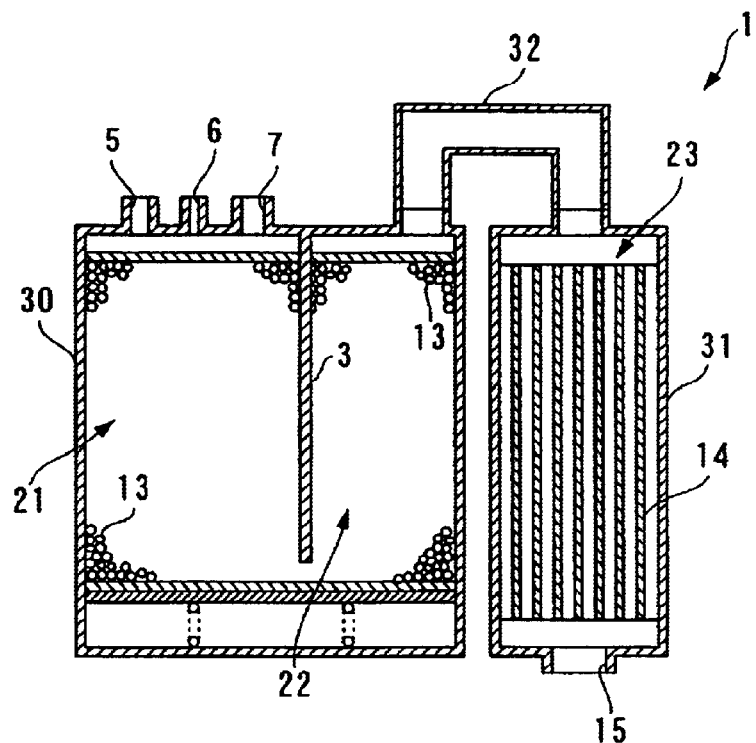
FIG. 4 is a cross-sectional view generally illustrating the structure of an exemplary modification to the evaporated fuel treatment apparatus.

FIG. 4 illustrates an exemplary modification to the canister 1 in the foregoing embodiment. As illustrated, this modified canister 1 differs from the canister 1 in the foregoing embodiment only in that a casing 31 of the third chamber 23 (a portion forming a sub-chamber) is defined separately from a casing 30 of the first chamber 21 and second chamber 22 (a portion forming a main chamber), spaced apart from these chambers, and connected to the casing 30 through a communication path 32. Since this canister 1 has the two separate casings 30, 31 spaced apart from each other, an external air contact area of walls of the casing 30 surrounding the second chamber 22, and an external air contact area of walls of the casing 31 are set larger than those in the foregoing embodiment. In this manner, the adsorbent 14 can be more effectively cooled down or heated through heat exchanging with external air than the foregoing embodiment. As a result, the canister 1 can be improved in the adsorption/desorption characteristic for the evaporated fuel.

Figure 5:
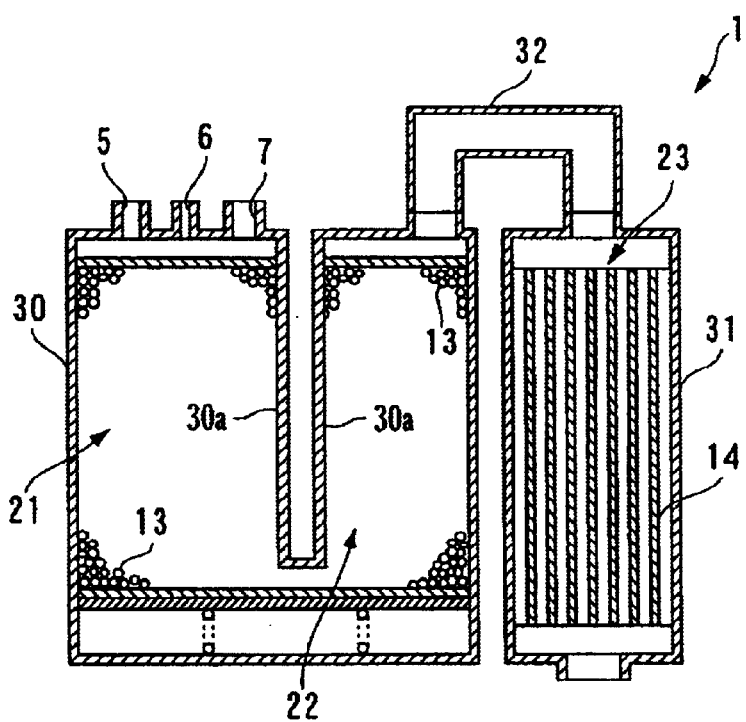
FIG. 5 is a cross-sectional view generally illustrating the structure of another exemplary modification to the evaporated fuel treatment apparatus.

A canister 1 illustrated in FIG. 5 shows an example in which the casing 30 of the canister 1 in FIG. 4 has the partition wall 3 between the first chamber 21 and second chamber 22 replaced with two walls 30a which are spaced apart from each other to additionally set a larger external air contact area of walls of the casing 30 surrounding the first chamber 21 and second chamber 22. Therefore, this modified canister 1 can further improve the adsorption/desorption performance.

Figure 8:
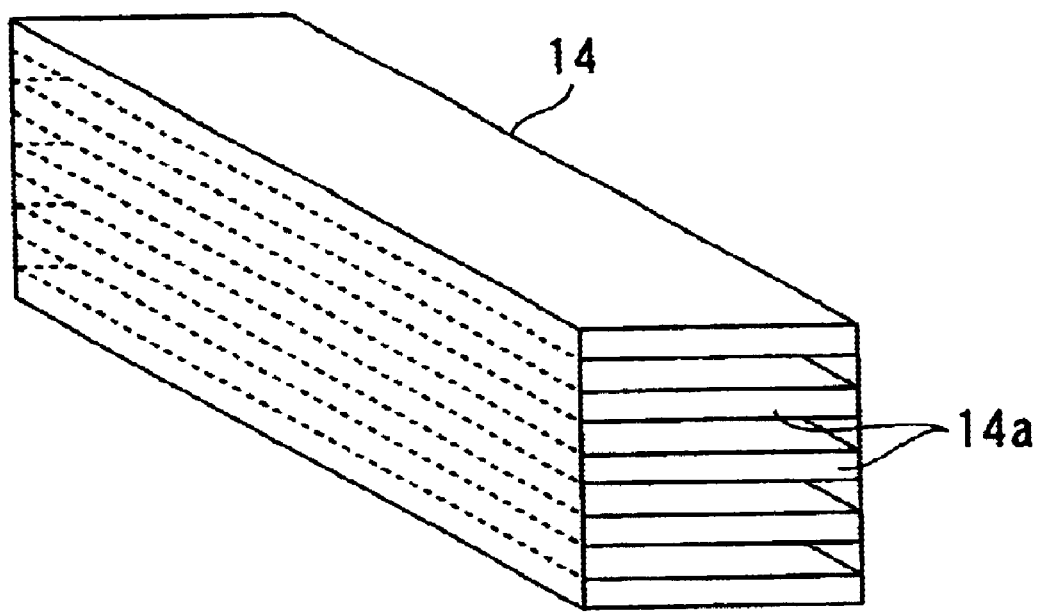
FIG. 8 is a perspective view illustrating an exemplary modification to the adsorbent.

It should be understood that the adsorbent 14 is not limited in shape to the honeycomb shape as illustrated in the foregoing embodiment, but may be in any shape as long as it has a smaller air-flow resistance than the active carbons 13 in the first chamber 21 and second chamber 22. For example, the adsorbent 14 may be formed with a slitted cross-section, as illustrated in FIG. 8. This adsorbent 14 can provide as well similar effects to those of the foregoing embodiment.

Figure 6A:
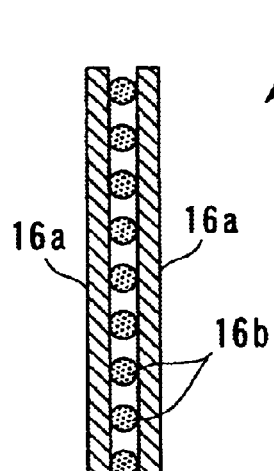
FIGS. 6A and 6B are cross-sectional views generally illustrating the structures of exemplary modifications to the adsorbent.
Figure 6B:
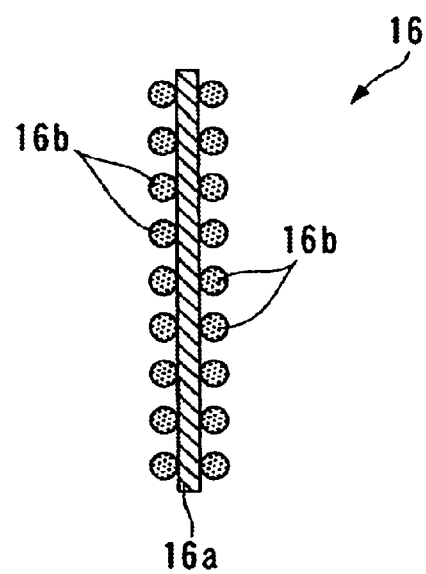
Figure 7:
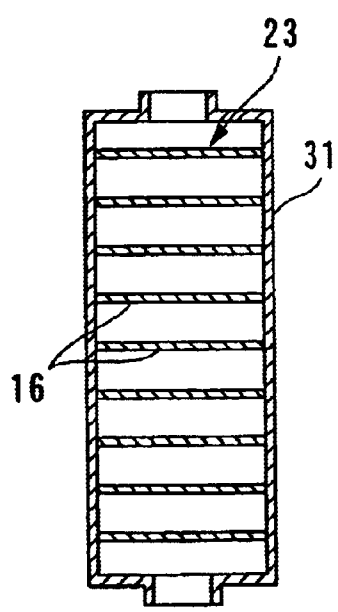
FIG. 7 is a cross-sectional view illustrating an exemplary modification to the adsorbent.

The adsorbent 14 is not either limited to that made of ceramic mixed with active carbons as illustrated in the foregoing embodiment, but any adsorbent may be used as long as it has a smaller air-flow resistance than the active carbons 13 in the first chamber 21 and second chamber 22, and has required adsorption performance. For example, the partitions 14a of the honeycomb structure in the aforementioned adsorbent 14 may be comprised of adsorbent sheets 16 illustrated in FIGS. 6A and 6B. The adsorbent sheet 16 illustrated in FIG. 6A comprises a large number of active carbons 16b sandwiched between two unwoven fabric sheets 16a in an integral structure. In this structure, the adsorbent sheet 16 is not limited to an unwoven fabric sheet, but may be any sheet which exhibits an air permeability such as a urethane sheet. The active carbons 16b are preferably mixed with a material having a large thermal capacity such as aluminum. On the other hand, the adsorbent sheet 16 illustrated in FIG. 6B is comprised of a single unwoven fabric sheet 16a, and a large number of active carbons 16b attached on both sides of the sheet 16a. In this structure, the sheet 16a may be made of a material which exhibits no air permeability. When the partition walls 14a of the adsorbent 14 are comprised of these adsorbent sheets 16, the resulting adsorbent 14 can also produce similar effects to those in the foregoing embodiment.

Further alternatively, as the adsorbent 14, a large number of the adsorbent sheets 16 may be disposed in the third chamber 23 in such a manner that the adsorbent sheets 16 are spaced apart from each other, and arranged in a horizontal direction perpendicular to the direction in which the evaporated fuel flows. In this case, the sheets 16 are only required to have the air permeability. The adsorbent 14 implemented in this manner can also produce similar effects to those in the foregoing embodiment. Alternatively, the adsorbent 14 may be made of fibrous active carbons.

The adsorbents filled in the first chamber 21 and second chamber 22 are not limited to those illustrated in the foregoing embodiment, but any adsorbent may be used as long as it provides desired adsorption performance. More preferably, active carbons are capable of adsorbing a majority of fuel components in an evaporated fuel introduced into the canister 1. Furthermore, the number of chambers filled with the adsorbents is not limited to three as illustrated in the foregoing embodiment, but may be two or four or more.

As described above, the evaporated fuel treatment apparatus according to the present invention can reduce a refilling time, ensure satisfactory adsorption/desorption performance for an evaporated fuel, and reduce a manufacturing cost through the simplified structure.

What is claimed is:

1. An evaporated fuel treatment apparatus for introducing an evaporated fuel generated in a fuel tank of an internal combustion engine to discharge the evaporated fuel to an intake passage, and emitting the evaporated fuel to the atmosphere after adsorbing fuel components contained in the evaporated fuel, said apparatus comprising:

a main chamber and a sub-chamber, wherein the main chamber is in communication with said fuel tank, and the sub-chamber is in communication with said main chamber and the atmosphere, respectively;

a main adsorbent contained in said main chamber for adsorbing fuel components in an evaporated fuel introduced from said fuel tank; and a sub-adsorbent contained in said sub-chamber for adsorbing fuel components in the evaporated fuel introduced from said main chamber before said evaporated fuel is emitted from said sub-chamber to the atmosphere, wherein said sub-chamber including said sub-adsorbent has an air-flow resistance which is smaller than an air-flow resistance of said main chamber including said main adsorbent, and wherein said sub-adsorbent is formed in a honeycomb shape formed by a large number of partition walls, and each of said partition walls comprises two spaced apart sheets each having an air permeability, and a large number of granular adsorbents sandwiched between said two sheets.

2. An evaporated fuel treatment apparatus for introducing an evaporated fuel generated in a fuel tank of an internal combustion engine to discharge the evaporated fuel to an intake passage, and emitting the evaporated fuel to the atmosphere after adsorbing fuel components contained in the evaporated fuel, said apparatus comprising:

a main chamber in communication with said fuel tank, and a sub-chamber in communication with said main chamber and the atmosphere, respectively;

a main adsorbent contained in said main chamber for adsorbing fuel components in an evaporated fuel introduced from said fuel tank, and a sub-adsorbent contained in said sub-chamber for adsorbing fuel components in the evaporated fuel introduced from said main chamber before said evaporated fuel is emitted from said sub-chamber to the atmosphere, wherein said sub-chamber including said sub-adsorbent has an air-flow resistance which is smaller than an air-flow resistance of said main chamber including said main adsorbent, and wherein said sub-adsorbent comprises a large number of adsorbent sheets each having an air permeability and disposed in said sub-chamber in a manner such that said adsorbent sheets are spaced apart from each other, and arranged in a direction perpendicular to a direction in which the evaporated fuel flows.

3. An evaporated fuel treatment apparatus according to claim 1 further comprising, a casing having formed therein the main chamber and the sub-chamber, wherein the main chamber is in communication with said fuel tank, and the sub-chamber is in communication with said main chamber and the atmosphere, respectively.

4. An evaporated fuel treatment apparatus according to claim 2 further comprising, a casing having formed therein the main chamber and the sub-chamber, wherein the main chamber is in communication with said fuel tank, and the sub-chamber is in communication with said main chamber and the atmosphere, respectively.

* * * * *